US012803057B2

(12) United States Patent
Lim et al.

(10) Patent No.: US 12,803,057 B2
(45) Date of Patent: Nov. 17, 2026

(54) APPARATUS AND METHOD FOR BATTERY LAMINATION PROCESSING

(71) Applicant: LG Energy Solution, Ltd., Seoul (KR)

(72) Inventors: Dae Bong Lim, Daejeon (KR); Shin Hwa Lee, Daejeon (KR); Jongmin Yoon, Daejeon (KR); Sijae Yoo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 799 days.

(21) Appl. No.: 18/024,920

(22) PCT Filed: Feb. 10, 2022

(86) PCT No.: PCT/KR2022/002021
§ 371 (c)(1),
(2) Date: Mar. 6, 2023

(87) PCT Pub. No.: WO2022/177227
PCT Pub. Date: Aug. 25, 2022

(65) Prior Publication Data

US 2023/0318043 A1 Oct. 5, 2023

(30) Foreign Application Priority Data

Feb. 18, 2021 (KR) ........................ 10-2021-0021737
Feb. 8, 2022 (KR) ........................ 10-2022-0016121

(51) Int. Cl.
*H01M 10/0585* (2010.01)
*H01M 4/04* (2006.01)
*H01M 10/04* (2006.01)

(52) U.S. Cl.
CPC ..... *H01M 10/0585* (2013.01); *H01M 4/0435* (2013.01); *H01M 10/0404* (2013.01)

(58) Field of Classification Search
CPC ......... H01M 10/0585; H01M 10/0404; H01M 10/0413; H01M 10/0468; H01M 10/052; H01M 10/04; H01M 4/0435; H01M 4/04; H01M 50/46; Y02E 60/10; Y02P 70/50
See application file for complete search history.

(56) References Cited

U.S. PATENT DOCUMENTS 10,637,092 B2 4/2020 Ogawa et al.
2016/0204473 A1 7/2016 Lindstrom et al.
2017/0263970 A1* 9/2017 Ogawa .................. H01M 50/55
(Continued)

FOREIGN PATENT DOCUMENTS

CN 105493331 A 4/2016
CN 111564654 A 8/2020
(Continued)

OTHER PUBLICATIONS

JP_2016157577_A Translation (Year: 2016).*
(Continued)

*Primary Examiner* — Stewart A Fraser
(74) *Attorney, Agent, or Firm* — Lerner David LLP

(57) ABSTRACT

A battery lamination processing apparatus includes a pressure roller that presses an electrode laminate, wherein the electrode laminate includes a first electrode, a second electrode, and a first separator, and wherein the pressure roller presses the outer surface of the electrode laminate along a travelling direction of the electrode laminate.

9 Claims, 4 Drawing Sheets

(56) References Cited

U.S. PATENT DOCUMENTS

| | | | | |
|---|---|---|---|---|
| 2018/0337382 | A1* | 11/2018 | Iida | H01M 50/417 |
| 2022/0181704 | A1 | 6/2022 | Shim et al. | |

FOREIGN PATENT DOCUMENTS

| | | | | | |
|---|---|---|---|---|---|
| CN | 112290103 | A | | 1/2021 | |
| JP | 2014203649 | A | | 10/2014 | |
| JP | 2015185372 | A | | 10/2015 | |
| JP | 2016157577 | A | * | 9/2016 | |
| JP | 6318257 | B2 | | 4/2018 | |
| JP | 2020135979 | A | | 8/2020 | |
| KR | 20150028537 | A | | 3/2015 | |
| KR | 20160110206 | A | | 9/2016 | |
| KR | 20160139639 | A | * | 12/2016 | H01M 10/4214 |
| KR | 20160141448 | A | | 12/2016 | |
| KR | 20190056812 | A | | 5/2019 | |
| KR | 20200030649 | A | | 3/2020 | |
| KR | 20200113822 | A | | 10/2020 | |
| WO | WO-2019039102 | A1 | * | 2/2019 | H01M 4/139 |

OTHER PUBLICATIONS

KR_20160139639_A Translation (Year: 2016).*
WO2019039102A1 Translation (Year: 2019).*
International Search Report of PCT/KR2022/002021 mailed Jun. 2, 2022. 3 pages.
Extended European Search Report including Written Opinion for Application No. 22756426.7 dated Aug. 6, 2024, pp. 1-6.
Search Report dated May 26, 26 from the Office Action for Chinese Application No. 202280006031.0 issued Jun. 1, 2026. 3 pgs.

* cited by examiner

【FIG. 1】
(PRIOR ART)
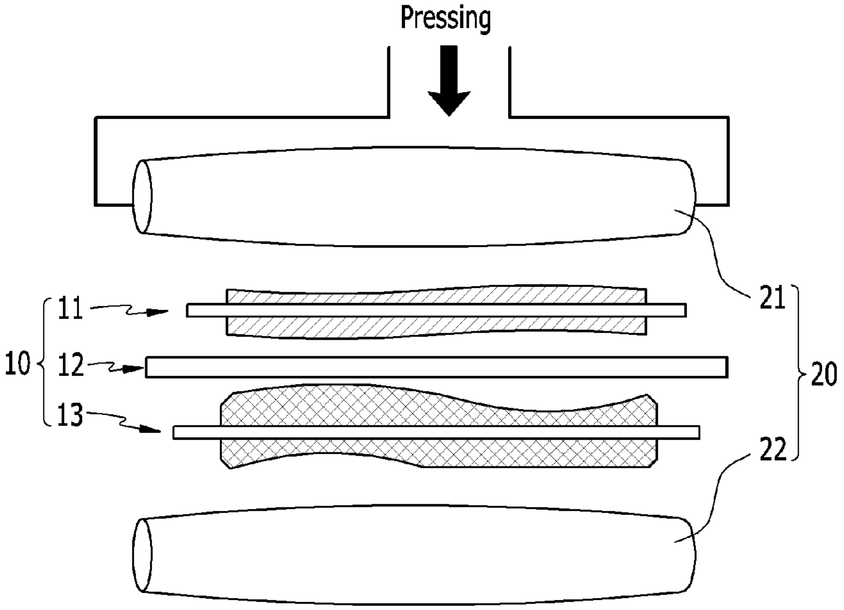
【FIG. 2】
(PRIOR ART)
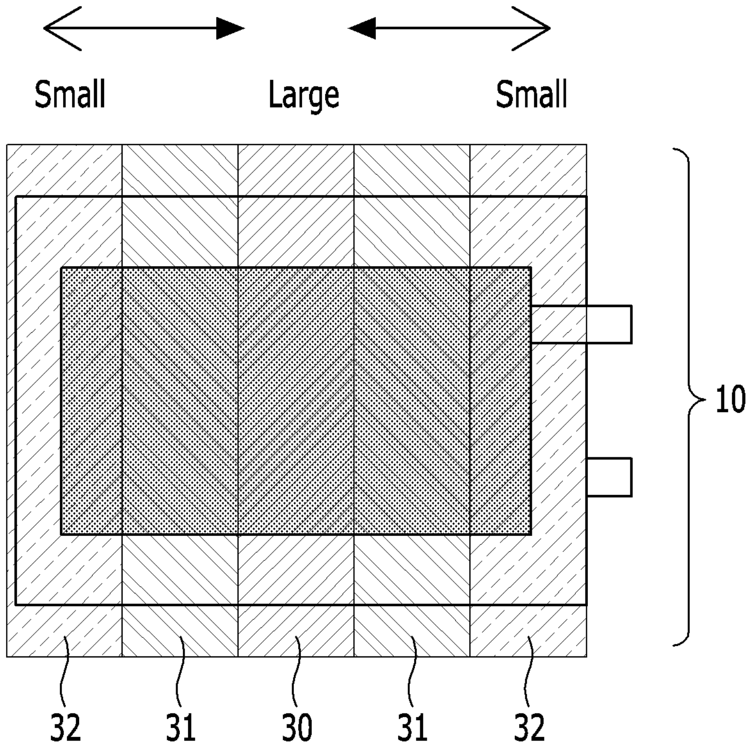

【FIG. 3】
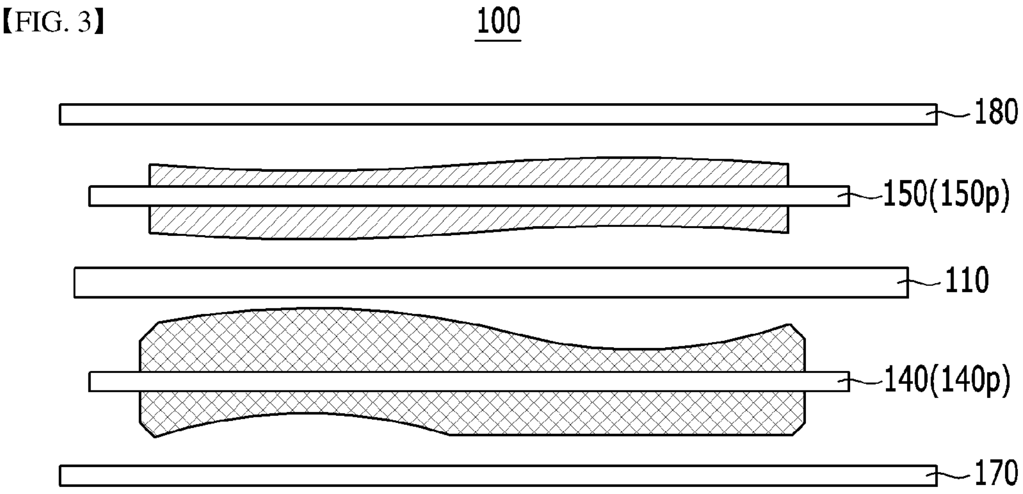
【FIG. 4】
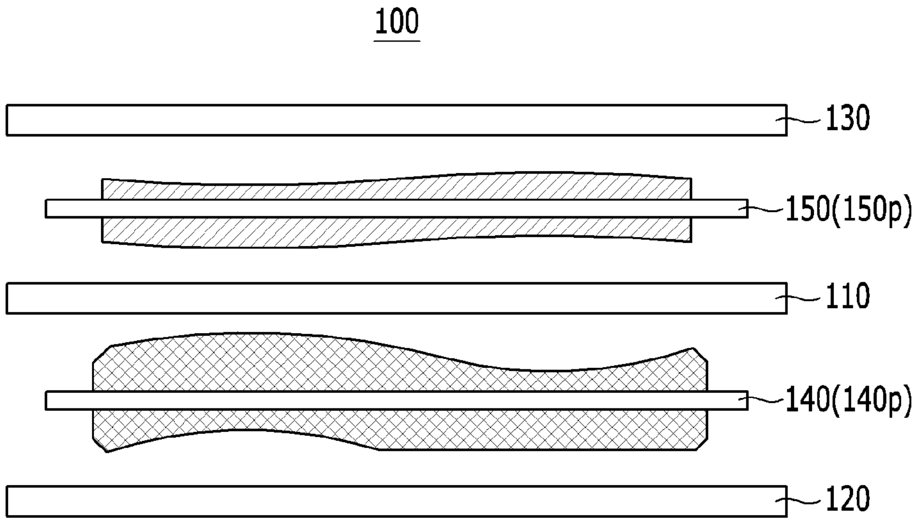

【FIG. 5】
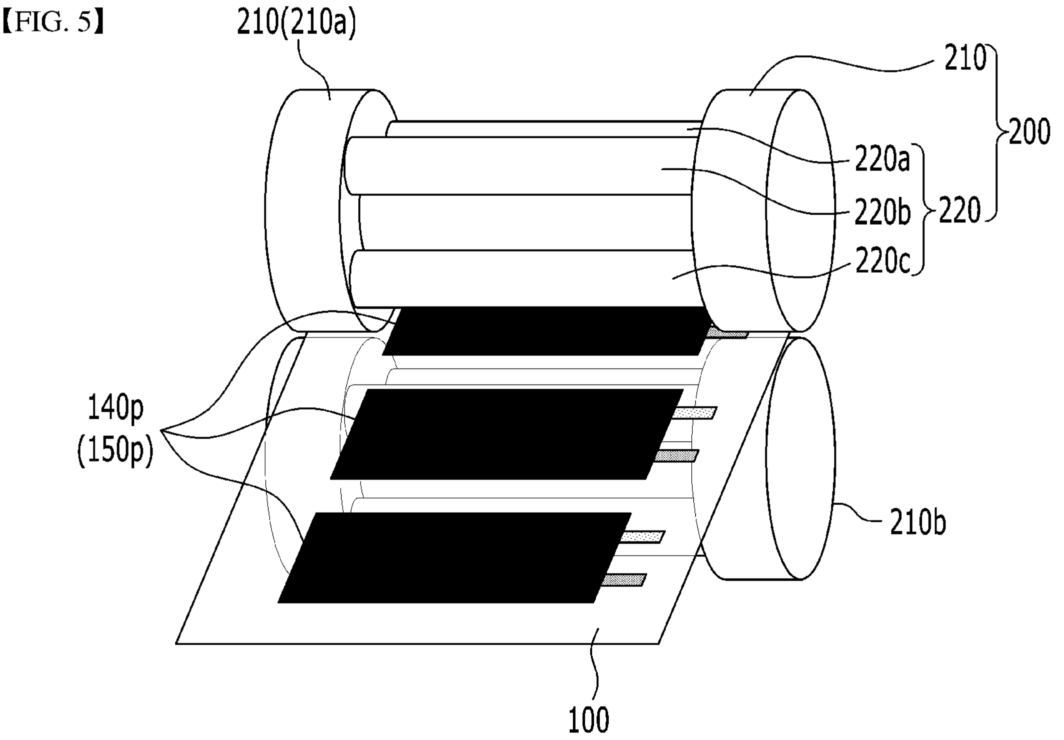
【FIG. 6】
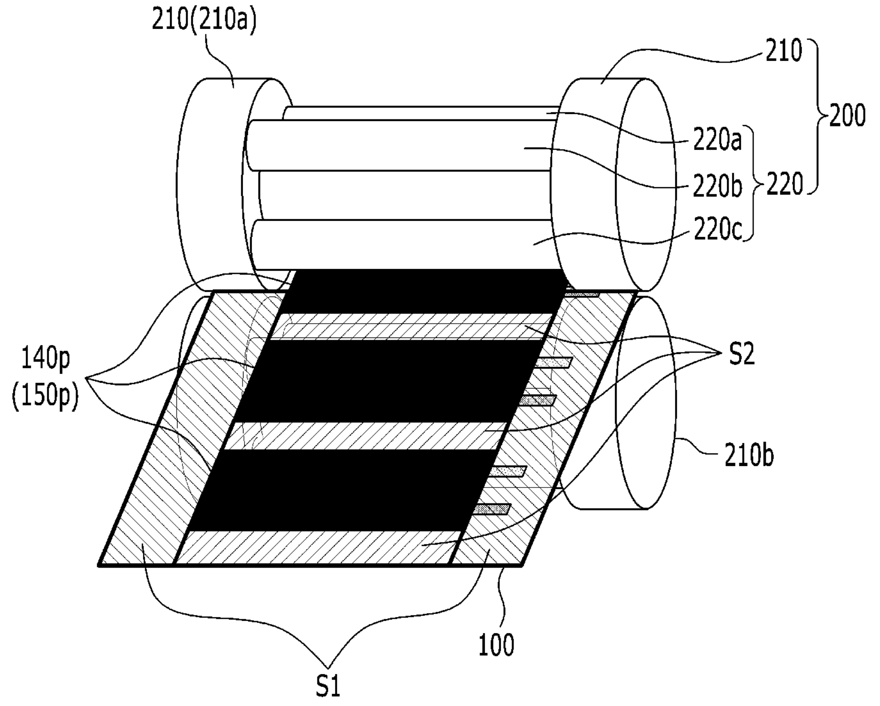

【FIG. 7】
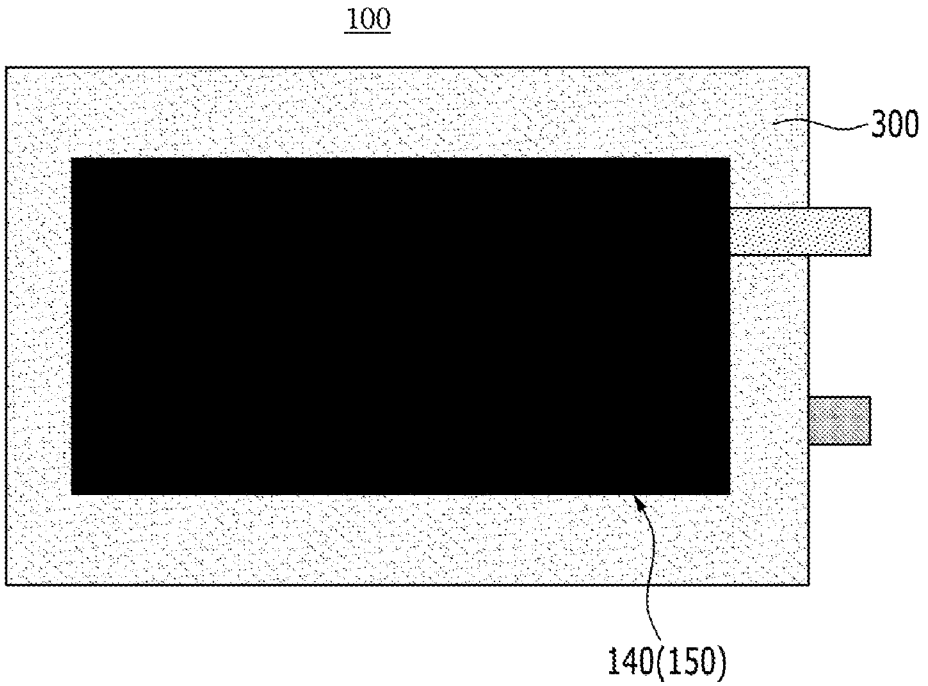
【FIG. 8】
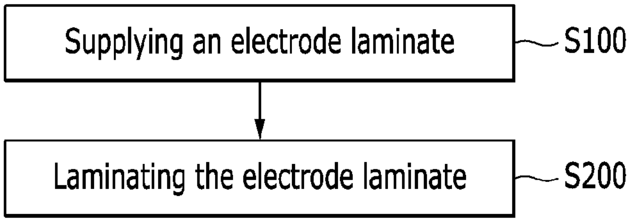

APPARATUS AND METHOD FOR BATTERY LAMINATION PROCESSING

CROSS-REFERENCE TO RELATED APPLICATIONS

This application is a national phase entry under 35 U.S.C. § 371 of International Application No. PCT/KR2022/002021, filed on Feb. 10, 2022, which claims the benefit of Korean Patent Application No. 10-2021-0021737 filed on Feb. 18, 2021 and Korean Patent Application No. 10-2022-0016121 filed on Feb. 8, 2022 all of which are incorporated herein by reference in their entireties.

FIELD OF THE INVENTION

The present disclosure relates to apparatus and method for battery lamination processing, and more particularly, to an apparatus and method for battery lamination processing that can laminate the electrode laminate.

BACKGROUND OF THE INVENTION

Along with the technology development and increased demand for mobile devices, demand for secondary batteries as energy sources has been increasing rapidly. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

Such a secondary battery is configured to house an electrode laminate and an electrolyte inside a case, and the electrode laminate has a lamination structure in which a negative electrode material, a positive electrode material, and a separator for separating them are alternately laminated. The lamination processing of the secondary battery is an important process of increasing the density through a thermocompression bonding of the electrode and the separator, thus enhancing the space utilization and providing high durability.

FIG. 1 is a diagram showing a lamination processing apparatus of a conventional electrode laminate. FIG. 2 is a diagram showing the adhesive force of the conventional electrode laminate pressed through the processing apparatus of FIG. 1.

Referring to FIGS. 1 and 2, in the conventional electrode laminate 10, the processes of sequentially laminating a negative electrode 13, a separator 12, and a positive electrode 11 from the bottom, and heating via a heating unit (not shown) so that they can be adhered, and bonding via a pressing part 20 including an upper roll 21 and a lower roll 22 can be sequentially performed. In the conventional processing, heating and pressing are performed through the integrated lamination roll, so that excessive dispersion of adhesive force due to roll deformation can occur. In particular, the adhesive force of the electrode laminate 10 after pressing is not uniform, and the adhesive force decreases as the electrode laminate 10 moves from the central part to the edge of the electrode laminate 10 based on the travelling direction. Therefore, a first adhesive part 30 exhibiting the highest adhesive force as the central part of the electrode laminate 10, a second adhesive part 31 adjacent to the first adhesive part and exhibiting a lower adhesive strength than the first adhesive part, and a third adhesive part 32 exhibiting the lowest adhesive force may be present in the electrode laminate 10.

Additionally, excessive adhesion may cause a local electrolyte wettability deterioration of the internal electrode. Furthermore, the adhesive force of the outer separator is reduced due to a roll crown phenomenon, which may cause a short circuit between the positive electrode and a negative electrode due to damage to the separator and folding. Due to the above problems, the quality of the product may eventually deteriorate and product defects may occur. Therefore, a new apparatus for solving the above problems is needed in the electrode lamination processing.

BRIEF SUMMARY OF THE INVENTION

It is an object of the present disclosure to provide an apparatus and method for battery lamination processing, including a pressure roller.

The objects of the present disclosure are not limited to the aforementioned objects, and other objects which are not described herein should be clearly understood by those skilled in the art from the following detailed description and the accompanying drawings.

According to an embodiment of the present disclosure, there is provided a battery lamination processing apparatus, comprising: a pressure roller that presses an electrode laminate, wherein the electrode laminate comprises a first electrode, a second electrode, and a first separator, and wherein the pressure roller presses the outer surface of the electrode laminate along a travelling direction of the electrode laminate.

The pressure roller includes a pair of first pressing members; and at least one second pressing member for connecting the pair of first pressing members, wherein the first pressing member rolls along the travelling direction of the electrode laminate, and the second pressing member may have a structure that extends long along a direction perpendicular to the travelling direction of the electrode laminate.

The second pressing member includes a plurality of pressing members separated from each other, and a plurality of pressing surfaces separated from each other along the travelling direction of the electrode laminate may be formed by the plurality of pressing members arranged separately from each other.

The first pressing member includes an upper pressing member positioned on the upper part of the electrode laminate, and a lower pressing member positioned on the lower part of the electrode laminate, the electrode laminate is configured such that the first electrode is positioned on one surface of the first separator, and the second electrode is positioned on the other surface of the first separator, and the electrode laminate may further include a first protective film positioned between the lower pressing member and the first electrode, and a second protective film positioned between the upper pressing member and the second electrode.

A sealing part may be formed between the outer surface of the electrode laminate and the first protective film, and between the outer surface of the electrode laminate and the second protective film.

The battery lamination processing apparatus further includes a second separator positioned between the first electrode and the first protective film, and a third separator positioned between the second electrode and the second protective film, wherein the sealing part may be formed between the first separator and the second separator and between the first separator and the third separator.

The first electrode includes a plurality of first electrode pieces separated along a travelling direction of the electrode laminate, the second electrode includes a plurality of second electrode pieces separated along a travelling direction of the electrode laminate, and a distance between the plurality of pressing members arranged separately may correspond to a distance between the first electrode pieces or a distance between the second electrode pieces that are formed in a travelling direction of the electrode laminate.

A 1-1 separator region and a 1-2 separator region are formed in the first separator, the 1-1 separator region includes a pair of continuous pressing surfaces that are formed along the travelling direction of the electrode laminate, and the pair of first pressing members may press the pair of continuous pressing surfaces which are the 1-1 separator region.

The first electrode piece and the second electrode piece may be sealed by the pair of continuous pressing surfaces pressed and the plurality of pressing surfaces separated.

The battery lamination processing apparatus may further include a heating unit arranged so as to heat the outer surface of the electrode laminate.

According to another embodiment of the present disclosure, there is provided a battery lamination processing method comprising the steps of: supplying an electrode laminate including a first separator, a first electrode arranged on one surface of the first separator, and a second electrode arranged on the other one surface of the first separator, and laminating the electrode laminate, wherein the laminating step comprises pressing the outer surface of the electrode laminate.

The outer surface of the electrode laminate includes a 1-1 separator region and a 1-2 separator region, and the 1-1 separator region may be continuously pressed, and the 1-2 separator region may be periodically pressed by a plurality of pressing members separated from each other.

The battery lamination processing method further comprises forming a protective film on the surface of the first electrode and the second electrode, respectively, and the laminating comprises pressing the protective film.

The laminating may further include heating the outer surface of the first separator.

The apparatus and method for battery lamination processing according to embodiments of the present disclosure are configured to form a sealing part on the outer surface of the electrode laminate through a pressure roller that presses the outer surface of the electrode laminate along the travelling direction of the electrode laminate. The sealing part is formed on the outer surface of the electrode laminate, thereby being able to improve the adhesive force of the separator and prevent a short circuit between the positive electrode and the negative electrode. In addition, a battery lamination processing apparatus is configured so as to press the outer surface of the electrode laminate, thereby being able to provide the effect of improving the precision of the loading interval and position of the electrode laminate.

In addition, it provides an effect of preventing deterioration of the wettability of the positive electrode and the negative electrode due to excessive adhesion of the electrode laminate.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a diagram showing a lamination processing apparatus of a conventional electrode laminate;

FIG. 2 is a diagram showing the adhesive force of the conventional electrode laminate pressed through the processing apparatus of FIG. 1;

FIG. 3 is a diagram of an electrode laminate pressed by a battery lamination processing apparatus according to an embodiment of the present disclosure;

FIG. 4 is a diagram of another electrode laminate pressed by the battery lamination processing apparatus according to an embodiment of the present disclosure;

FIG. 5 is a diagram showing a battery lamination processing apparatus according to an embodiment of the present disclosure;

FIG. 6 is a diagram showing a region of the first separator shown in FIG. 5;

FIG. 7 is a plan view showing an electrode laminate pressed through the processing apparatus of FIG. 5; and FIG. 8 is a flowchart of a battery lamination processing method according to an embodiment of the present disclosure.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be modified in various different ways, and is not limited to the embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the description, when a portion is referred to as "including" or "comprising" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross section cut vertically.

The terms "first," "second," etc. are used to explain various components, but the components should not be limited by the terms. These terms are only used to distinguish one component from the other component.

Hereinafter, a battery lamination processing apparatus according to an embodiment of the present disclosure will be described with reference to FIGS. 3 to 7.

FIG. 3 is a diagram of an electrode laminate pressed by a battery lamination processing apparatus according to an embodiment of the present disclosure. FIG. 4 is a diagram of another electrode laminate pressed by the battery lamination processing apparatus according to an embodiment of the present disclosure. FIG. 5 is a diagram showing a battery lamination processing apparatus according to an embodiment of the present disclosure. FIG. 6 is a diagram showing a region of the first separator shown in FIG. 5. FIG. 7 is a plan view showing an electrode laminate pressed through the processing apparatus of FIG. 5.

Referring to FIGS. 3 to 7, the battery lamination processing apparatus according to an embodiment of the present disclosure includes a pressure roller 200 that presses the electrode laminate 100.

Referring to FIG. 3, the electrode laminate 100 includes a first electrode 140 and a second electrode 150, and includes a first separator 110 positioned between the first electrode 140 and the second electrode 150. That is, the first electrode 140 is positioned on one surface of the first separator 110, and the second electrode 150 is positioned on the other surface of the first separator 110. In addition, the electrode laminate may further include a first protective film 170 positioned under the first electrode 140 and a second protective film 180 positioned on the second electrode 150. Specifically, the first separator 110 is supplied between an upper pressing member 210*a* and a lower pressing member 210*b* included in the battery lamination processing apparatus described later in FIG. 6, and may have a structure that extends along a travelling direction of the electrode laminate 100. Further, the first electrode 140 may be formed in a form having a plurality of first electrode pieces 140*p* that are separated from each other at the lower part of the first separator 110, and the second electrode 150 may be formed in a form having a plurality of second electrode pieces 150*p* that are separated from each other at the upper part of the first separator 110.

Referring to FIG. 4, the electrode laminate 100 includes a second separator 120 positioned between the first electrode 140 and the first protective film 170, and a third separator 130 positioned between the second electrode 150 and the second protective film 180. That is, although not shown in FIG. 4, a first protective film 170 and a second protective film 180 may be respectively formed on the lowermost end and the uppermost end of the electrode laminate 100 as shown in FIG. 3. However, such a lamination order is not limited and can be modified. Further, the first electrode 140 may be a positive electrode, and the second electrode 150 may be a negative electrode, but may be opposite to each other.

The first separator 110 can separate the first electrode 140 and the second electrode 150 having different polarities, thereby securing the safety of the electrode laminate 100. Additionally, while the electrode laminate 100 laminated as described above advances in a linear direction through a moving means such as a conveyor belt, the processes according to embodiments described later can be performed.

However, in the past, the electrode laminate was thermo-compression-bonded through the appropriate level of temperature and pressure set in the heating unit and pressure roller. Nevertheless, due to the use of integrated rollers, the adhesive force was not uniform. Occasionally, there was a problem that electrolyte wettability is lowered due to excessive adhesive force, or the adhesive force of the separator is lowered, resulting in damage to the separator and a short circuit between the positive electrode and the negative electrode.

Therefore, according to the present embodiment, as shown in FIG. 5, the electrode laminate 100 that passes between the pressure rollers 200 can be pressed using the pressure rollers 200 which respectively disposed on the upper and lower sides of the electrode laminate 100 and designed to have different pressing conditions for each position. Specifically, the pressure roller 200 can press the outer surface of the electrode laminate 100 along the travelling direction of the electrode laminate 100. Here, the outer surface of the electrode laminate 100 includes a region of the first separator 110 where the first separator 110 and the first electrode 140 and the first separator 110 and the second electrode 150 do not come into surface contact. The outer surface of the electrode laminate 100 is pressed in the region of the first separator 110 by the pressure roller 200 to form the sealing part 300.

Specifically, referring to FIG. 7, the sealing part 300 may be formed on the outer surface of the electrode laminate 100 by pressing the outer surface. Thereby, the electrode laminate 100 can be pressed to secure the durability of the electrode laminate 100 and increase the density, thereby improving the space utilization of the secondary battery. Further, the sealing part 300 shown in FIG. 7 can be formed only on the outer surface, thereby achieving the effect of preventing excessive dispersion of adhesive force and preventing deterioration of electrolyte wettability caused by excessive adhesion on the electrode laminate 100. Further, the adhesive force of the separator can be improved, thereby preventing the occurrence of short circuits between the positive electrode and the negative electrode.

In particular, the battery lamination processing apparatus according to the present embodiment may be formed so as to press the outer surface of the electrode laminate 100, which is a region of the first separator 110 where the first separator 110 and the electrodes 140 and 150 do not come into surface contact with each other, in accordance with the sizes of the first electrode 140 and the second electrode 150 of the electrode laminate 100. Consequently, it is possible to exhibit the effect of improving the accuracy of the interval and position at which the electrode laminate 100 is charged.

Referring to FIG. 5, in the battery lamination processing apparatus according to the present embodiment, the pressure roller 200 includes a pair of first pressing members 210 that can rotate along the traveling direction of the electrode laminate 100, and at least one second pressing member 220 that connects the pair of first pressing members 210. At this time, the first pressing member 210 rolls along the travelling direction of the electrode laminate 100, and the second pressing member 220 may have a structure that extends longitudinally along a direction perpendicular to the travelling direction of the electrode laminate 100.

The second pressing member 220 may include a plurality of pressing members 220*a*, 220*b*, and 200*c*, and the plurality of pressing members 220*a*, 220*b*, and 220*c* included in the second pressing member 220 may be arranged separately from each other. A plurality of pressing surfaces separated from each other along the travelling direction of the electrode laminate 100 may be formed by the pressing members 220*a*, 220*b*, and 220*c* arranged separately.

Further, the first pressing member 210 may further include an upper pressing member 210*a* positioned at the upper part of the electrode laminate 100 that is charged in the processing apparatus according to the present embodiment, and a lower pressing member 210*b* positioned at the lower part of the electrode laminate 100. Therefore, the first protective film 170 may be positioned between the lower pressing member 210*b* and the first electrode 140, and the second protective film 180 may be positioned between the upper pressing member 210*a* and the second electrode 150.

The first pressing member 210 and the second pressing member 220 formed as above can press the first protective film 170 and the second protective film 180, and therefore, a substantial portion pressed by the pressing member can be the protective film, but is not limited thereto. Through the pressing of the first pressing member 210 and the second pressing member 220, a sealing part 300 can be formed between the outer surface of the electrode laminate 100 and the first protective film 170, and between the outer surface of the electrode laminate 100 and the second protective film 180.

Additionally, the electrode laminate 100 may further include the second separator 120 and the third separator 130 as described above. The second separator 120 may be positioned between the first electrode 140 and the first protective film 170, and the third separator 130 may be positioned between the second electrode 150 and the second protective film 180. Therefore, by pressing the first pressing member 210 and the second pressing member 220, a sealing part 300 may also be formed between the first separator 110 and the second separator 120 and between the first separator 110 and the third separator 130.

According to the present embodiment, the first electrode 140 includes a plurality of first electrode pieces 140*p* that are separated along the traveling direction of the electrode laminate 100, and the second electrode 150*p* includes a plurality of second electrode pieces 150*p* that are separated from each other in the traveling direction of the electrode laminate 100.

At this time, the distance between the plurality of pressing members 220*a*, 220*b*, and 220*c* arranged separately from each other may substantially correspond to a distance between the first electrode pieces 140*p* or a distance between the second electrode pieces 150*p* that are formed in the travelling direction of the electrode laminate 100. Further, referring to FIGS. 3 and 6, the first separator 110 according to the present embodiment has a 1-1 separator region S1 that does not come into surface contact with the first electrode 140 and the second electrode 150 based on the traveling direction of the electrode laminate 100, that is, the first separator 110 has a longer length based on a direction perpendicular to the traveling direction of the electrode laminate 100, whereby a 1-1 separator region S1 that does not come into surface contact with the first electrode 140 and the second electrode 150 can be formed. In addition, the first separator 110 has a 1-2 separator region S2 that does not come into surface contact with the first electrode 140 and the second electrode 150 based on a direction perpendicular to the travelling direction of the electrode laminate 100, that is, the first separator 110 has a wider width than the first electrode piece 140*p* and the second electrode piece 150*p* based on the travelling direction of the electrode laminate 100, whereby a 1-2 separator region S2 that does not come into surface contact with the first electrode 140 and the second electrode 150 can be formed.

Through this, the pair of first pressing members 210 can press the 1-1 separator region S1 to form a pair of continuous pressing surfaces that are formed along the travelling direction of the electrode laminate 100. Therefore, the 1-1 separator region S1 may include a pair of continuous pressing surfaces that are formed along the traveling direction of the electrode laminate 100. Further, for each of the plurality of 1-2 separator regions S2 formed between the first electrode pieces 140*p* adjacent to each other or the second electrode pieces 150*p* adjacent to each other, one of the plurality of pressing members 220*a*, 220*b*, and 220*c* arranged separately from each other can press the respective 1-2 separator regions S2. Therefore, the plurality of pressing members 220*a*, 220*b*, and 220*c* arranged separately from each other as described above can form a plurality of pressing surfaces separated from each other along the traveling direction of the electrode laminate 100.

In addition, the first electrode piece 140*p* and the second electrode piece 150*p* can be sealed by the pair of continuous pressing surfaces pressed as above and the plurality of pressing surfaces separated as above. Due to the sealing, the effect of improving the adhesive force of the separator and preventing the occurrence of short circuits between the positive electrode and the negative electrode can be achieved.

The battery lamination apparatus according to the present embodiment may further include a heating unit (not shown). By further including the heating unit capable of heating the outer surface of the electrode laminate 100, the adhesive force and sealing force of the sealing part 300 pressed by the pressure roller 200 can be improved.

Next, an electrode lamination processing method according to another embodiment of the present disclosure will be described with reference to FIGS. 3 to 8.

FIG. 8 is a flowchart of a battery lamination processing method according to an embodiment of the present disclosure.

The electrode lamination processing method according to an embodiment of the present disclosure comprises a step S100 of supplying an electrode laminate 100 including a separator 110, a first electrode 140 arranged on one surface of the first separator 110, and a second electrode 150 arranged on the other one surface of the first separator 110, and a step S200 of laminating the electrode laminate 100. Further, the laminating step includes pressing the outer surface of the electrode laminate 100. The outer surface of the electrode laminate 100 is a portion in which a region of the first separator 110 where the first separator 110 and the first electrode 140 and the first separator 110 and the second electrode 150 do not come into surface contact is pressed.

At this time, the first separator 110 can separate the first electrode 140 and the second electrode 150 to secure the safety of the electrode laminate 100.

Specifically, the outer surface of the electrode laminate 100 includes a 1-1 separator region S1 that does not come into surface contact with the first electrode 140 and the second electrode 150 based on the travelling direction of the electrode laminate 100. Further, the outer surface of the electrode laminate 100 includes a 1-2 separator region S2 that does not come into surface contact with the first electrode 140 and the second electrode 150 based on a direction perpendicular to the traveling direction of the electrode laminate 100.

The 1-1 separator region S1 may be continuously pressed, and the 1-2 separator region S2 may be periodically pressed by a plurality of pressing members 220*a*, 220*b*, and 220*c* that are separated from each other.

Additionally, the method further includes a step of forming a protective film on the surfaces of the first electrode 140 and the second electrode 150, respectively. Specifically, the protective film may be a first protective film 170 and a second protective film 180. Therefore, the laminating step S200 may include pressing the protective film. Further, according to the present embodiment, the laminating step S200 may further include a step of heating only the outer surface of the first separator 110. By further comprising heating the outer surface of the separator 110, the adhesive force and sealing force of the sealing part 300 formed on the outer surface can be improved.

Although preferred embodiments of the present disclosure have been described in detail above, the scope of the present disclosure is not limited thereto, and numerous other modifications and embodiments can be devised by those skilled in the art, without departing from the spirit and scope of the principles of the invention described in the appended claims. Further, these modifications should not be understood individually from the technical spirit or perspective of the present disclosure.

DESCRIPTION OF REFERENCE NUMERALS

100: electrode laminate
110: first separator
120: second separator
130: third separator
140: first electrode
150: second electrode
200: pressure roller
210: first pressing member
220: second pressing member
300: sealing part

The invention claimed is:

1. A battery lamination processing apparatus, comprising:

a pressure roller configured to press an electrode laminate, wherein the electrode laminate comprises a first electrode, a second electrode, and a first separator, wherein the pressure roller is configured to press an outer surface of the electrode laminate along a travelling direction of the electrode laminate, wherein the pressure roller comprises a pair of first pressing members;

at least one second pressing member for connecting the pair of first pressing members;

wherein the pair of first pressing members is configured to roll along the travelling direction of the electrode laminate, and the at least one second pressing member has a structure that extends longitudinally along a direction perpendicular to the travelling direction of the electrode laminate, and wherein the at least one second pressing member comprises a plurality of pressing members separated from each other, the plurality of pressing members arranged along circumferences of the pair of the first pressing members such that a rolling movement of the pair of first pressing members is configured to sequentially bring each of the plurality of pressing members in contact with the electrode laminate.

2. The battery lamination processing apparatus of claim 1, wherein:

a plurality of pressing surfaces separated from each other along the travelling direction of the electrode laminate are formed by the plurality of pressing members arranged separately from each other.

3. The battery lamination processing apparatus of claim 2, wherein:

each of the pair of first pressing members comprises an upper pressing member positioned on an upper part of the electrode laminate, and a lower pressing member positioned on a lower part of the electrode laminate, the electrode laminate is configured such that the first electrode is positioned on one surface of the first separator, and the second electrode is positioned on another surface of the first separator, and the electrode laminate further comprises a first protective film positioned between the lower pressing member and the first electrode, and a second protective film positioned between the upper pressing member and the second electrode.

4. The battery lamination processing apparatus of claim 3, further comprising:

a sealing part formed between the outer surface of the electrode laminate and the first protective film, and between the outer surface of the electrode laminate and the second protective film.

5. The battery lamination processing apparatus of claim 4, further comprising:

a second separator positioned between the first electrode and the first protective film, and a third separator positioned between the second electrode and the second protective film, wherein the sealing part is formed between the first separator and the second separator and between the first separator and the third separator.

6. The battery lamination processing apparatus of claim 4, wherein:

the first electrode comprises a plurality of first electrode pieces separated along a travelling direction of the electrode laminate, the second electrode comprises a plurality of second electrode pieces separated along a travelling direction of the electrode laminate, and a distance between the plurality of pressing members arranged separately corresponds to a distance between the first electrode pieces or a distance between the second electrode pieces that are formed in a travelling direction of the electrode laminate.

7. The battery lamination processing apparatus of claim 6, wherein:

a 1-1 separator region and a 1-2 separator region are formed in the first separator, the 1-1 separator region comprises a pair of continuous pressing surfaces that are formed along the travelling direction of the electrode laminate, and the pair of first pressing members press the pair of continuous pressing surfaces which are the 1-1 separator region.

8. The battery lamination processing apparatus of claim 7, wherein:

the first electrode piece and the second electrode piece are sealed by the pair of continuous pressing surfaces pressed and the plurality of pressing surfaces separated.

9. The battery lamination processing apparatus of claim 1, wherein:

further comprising a heating unit arranged so as to heat the outer surface of the electrode laminate.

* * * * *